(12) United States Patent
Li et al.

(10) Patent No.: US 9,735,853 B2
(45) Date of Patent: Aug. 15, 2017

(54) METHOD AND DEVICE FOR LOW-COMPLEXITY FEEDBACK IN A MULTIUSER AND MULTIPOINT COOPERATIVE COMMUNICATION SYSTEM

(75) Inventors: Hua Li, Yongin-si (KR); Jun Il Choi, Seoul (KR); Bruno Clerckx, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 13/982,603

(22) PCT Filed: May 11, 2011

(86) PCT No.: PCT/KR2011/003461
§ 371 (c)(1),
(2), (4) Date: Dec. 2, 2013

(87) PCT Pub. No.: WO2012/102441
PCT Pub. Date: Aug. 2, 2012

(65) Prior Publication Data
US 2014/0348060 A1 Nov. 27, 2014

(30) Foreign Application Priority Data

Jan. 30, 2011 (CN) .................. 2011 1 0035983
Mar. 18, 2011 (KR) .................. 10-2011-0024270

(51) Int. Cl.
*H04W 4/00* (2009.01)
*H04B 7/06* (2006.01)
(Continued)

(52) U.S. Cl.
CPC ........... *H04B 7/0643* (2013.01); *H04B 7/024* (2013.01); *H04B 7/0452* (2013.01); *H04B 7/063* (2013.01); *H04B 7/0632* (2013.01); *H04B 7/0639* (2013.01)

(58) Field of Classification Search
CPC .......... H04B 7/02; H04B 7/024; H04B 7/063; H04B 7/0639; H04B 7/0452
See application file for complete search history.

(56) References Cited

U.S. PATENT DOCUMENTS 5,784,375 A * 7/1998 Kalkunte ............. H04L 12/413
370/448
7,649,831 B2 * 1/2010 Van Rensburg et al. ..... 370/203
(Continued)

FOREIGN PATENT DOCUMENTS

CN 1647414 A 7/2005
CN 101601216 A 12/2009
(Continued)

OTHER PUBLICATIONS

R1-102745, 3GPP TSG RAN WG1 Meeting #61, Montreal, Canada, May 10-14, 2010.
(Continued)

*Primary Examiner* — Ian N Moore
*Assistant Examiner* — Phong La
(74) *Attorney, Agent, or Firm* — Jefferson IP Law, LLP

(57) ABSTRACT

Provided are a method and device for low-complexity feedback in a multiuser and multipoint cooperative communication system. The base station in the multiuser and multipoint cooperative communication system transmits a feedback stop signal to a terminal in order for the terminal receiving the feedback stop signal to stop feedback for a predetermined period. The terminal receiving the feedback stop signal stops the feedback of channel information for a period indicated by the feedback stop signal.

17 Claims, 5 Drawing Sheets

(51) Int. Cl.
*H04B 7/024* (2017.01)
*H04B 7/0452* (2017.01)

(56) References Cited

U.S. PATENT DOCUMENTS

| | | | | |
|---|---|---|---|---|
| 2003/0016641 | A1* | 1/2003 | Terry | H04L 1/0001 370/335 |
| 2004/0192308 | A1* | 9/2004 | Lee et al. | 455/436 |
| 2005/0047416 | A1* | 3/2005 | Heo et al. | 370/395.4 |
| 2006/0282739 | A1* | 12/2006 | Meyer et al. | 714/748 |
| 2007/0081454 | A1* | 4/2007 | Bergamasco et al. | 370/229 |
| 2007/0249401 | A1* | 10/2007 | Kim et al. | 455/562.1 |
| 2008/0101407 | A1* | 5/2008 | Khan et al. | 370/468 |
| 2008/0165717 | A1* | 7/2008 | Chen et al. | 370/312 |
| 2009/0046604 | A1* | 2/2009 | Matsumoto | H04L 27/2655 370/280 |
| 2009/0052326 | A1* | 2/2009 | Bergamasco | H04L 47/10 370/236 |
| 2009/0154588 | A1* | 6/2009 | Chen et al. | 375/267 |
| 2009/0196230 | A1* | 8/2009 | Kim | H04W 74/002 370/328 |
| 2009/0201861 | A1* | 8/2009 | Kotecha | H04L 1/0027 370/329 |
| 2009/0207799 | A1* | 8/2009 | Mazzarese | 370/329 |
| 2009/0213817 | A1* | 8/2009 | Park et al. | 370/336 |
| 2009/0316624 | A1* | 12/2009 | Van Der Wateren | 370/328 |
| 2010/0050037 | A1* | 2/2010 | Chang et al. | 714/748 |
| 2010/0054145 | A1* | 3/2010 | Frenger | H04W 72/085 370/252 |
| 2010/0111067 | A1* | 5/2010 | Wu | H04W 74/008 370/345 |
| 2010/0182903 | A1* | 7/2010 | Palanki | H04L 1/0041 370/225 |
| 2011/0021230 | A1 | 1/2011 | Moberg et al. | |
| 2011/0116364 | A1* | 5/2011 | Zhang | H04W 74/08 370/216 |
| 2011/0319092 | A1* | 12/2011 | Kim et al. | 455/452.1 |
| 2012/0027111 | A1* | 2/2012 | Vook | H04B 7/0452 375/267 |
| 2012/0329502 | A1* | 12/2012 | Frederiksen et al. | 455/509 |
| 2014/0003395 | A1* | 1/2014 | Hsu et al. | 370/335 |

FOREIGN PATENT DOCUMENTS

| | | |
|---|---|---|
| JP | 2007-274159 A | 10/2007 |
| KR | 10-2004-0088547 A | 10/2004 |
| KR | 10-2009-0058033 A | 6/2009 |
| WO | 2007/136070 A1 | 11/2007 |
| WO | 2010/042235 A1 | 4/2010 |

OTHER PUBLICATIONS

Qualcomm Incorporated, CQI for CA, 3GPP TSG RAN WG1 #61, R1-102745, May 10-14, 2010, Montreal, Canada.
Panasonic; CQI Feedback Control and Content in E-UTRA; 3GPP TSG-RAN WG1 Meeting #49; R1-072077; May 7-11, 2007; Kobe, Japan.

* cited by examiner

2
METHOD AND DEVICE FOR LOW-COMPLEXITY FEEDBACK IN A MULTIUSER AND MULTIPOINT COOPERATIVE COMMUNICATION SYSTEM

TECHNICAL FIELD

Example embodiments relate to a method and device for a low-complexity feedback in multiuser and multipoint cooperated transmission/reception.

BACKGROUND ART

In a radio communication system, terminals may measure channel information between a base station and a terminal and feed back the channel information to the base station. The base station may schedule the terminals and transmit data based on the received channel information. As a number of terminals served by the base station increases, feedback overhead with respect to the channel information of the terminals may increase.

DISCLOSURE OF THE INVENTION

Technical solutions

According to example embodiments, there is provided a method of feeding back channel information by a terminal in a multiple input multiple output (MIMO) communication system including a base station and a plurality of terminals, the method including receiving a feedback stop signal from the base station, determining a section for which feedback of the channel information is to be stopped, based on the feedback stop signal, and feeding back the channel information to the base station at a feedback point in time corresponding to the determined section.

The feedback stop signal may include information about a section N for which feedback of the channel information is to be stopped, and the section N may be determined based on a number of terminals communicating with the base station and transmission ranks of the base station.

The section N may be proportional to the number of the terminals communicating with the base station and inversely proportional to a number of the transmission ranks of the base station.

The feeding back may include performing periodic feedback of channel information based on a predetermined feedback interval after the feedback point in time corresponding to the determined section elapses.

The receiving may include receiving the feedback stop signal through a downlink control channel (DCI).

The method may further include stopping feedback of the channel information for the determined section.

The section may include at least one subframe following a subframe at which the feedback stop signal is received.

The channel information may include at least one of a precoding matrix indicator (PMI), channel quality information (CQI), and a rank indicator (RI).

According to example embodiments, there is also provided a communication method of a base station in a MIMO communication system including the base station and a plurality of terminals, the method including generating a feedback stop signal, transmitting the feedback stop signal to at least one terminal for a terminal receiving the feedback top signal to stop feeding back channel information to the base station over a period indicated by the feedback stop signal, and receiving channel information from at least one terminal receiving the feedback stop signal after the period indicated by the feedback stop signal elapses.

The generating may include determining a section N for which feedback of the channel information is to be stopped, based on a number of terminals communicating with the base station and transmission ranks of the base station, and generating the feedback stop signal including information about the determined section N.

The determining may include determining the section N to be proportional to the number of the terminals communicating with the base station and to be inversely proportional to a number of the transmission ranks of the base station.

The transmitting may include transmitting the feedback stop signal through a downlink control channel (DCI).

According to example embodiments, there is also provided a method of feeding back channel information by a terminal in a cooperative MIMO communication system including the terminal and a plurality of base stations cooperating with each other, the method including receiving a feedback stop signal from at least one of the plurality of base stations, determining a section for which feedback of the channel information is to be stopped, based on the feedback stop signal, and feeding back the channel information to at least one of the plurality of base stations at a feedback point in time corresponding to the determined section.

The feedback stop signal may include information about a section N for which feedback of the channel information is to be stopped, and the section N may be determined based on a number of terminals communicating with the base station and transmission ranks of the base station.

The feeding back may include performing periodic feedback of channel information based on a predetermined feedback interval after the feedback point in time corresponding to the determined section elapses.

According to example embodiments, there is also provided a terminal for feeding back channel information in a MIMO communication system including a base station and a plurality of terminals, the terminal including a receiver to receive a feedback stop signal from the base station, a feedback stop section determiner to determine a section for which feedback of the channel information is to be stopped, based on the feedback stop signal, and a transmitter to feed back the channel information to the base station at a feedback point in time corresponding to the determined section.

The feedback unit may perform periodic feedback of channel information based on a predetermined feedback interval after the feedback point in time corresponding to the determined section elapses.

Advantageous Effects of the Invention

Example embodiments provide a base station that may transmit a feedback stop signal for a terminal receiving the feedback stop signal to stop feedback for a predetermined period, thereby reducing feedback overhead of the terminal and increasing an efficiency of a communication system.

Example embodiments provide a terminal that may stop feeding back channel information over a period indicated by a feedback stop signal, when the feedback stop signal is received from a base station, thereby reducing feedback overhead.

Example embodiments provide a base station that may transmit a feedback stop signal for a terminal to stop feedback for a predetermined period, as necessary, in a situation in which the terminal performs periodic feedback of channel information, thereby controlling feedback overhead in a simple manner.

BEST MODE FOR CARRYING OUT THE INVENTION

Figure 1:
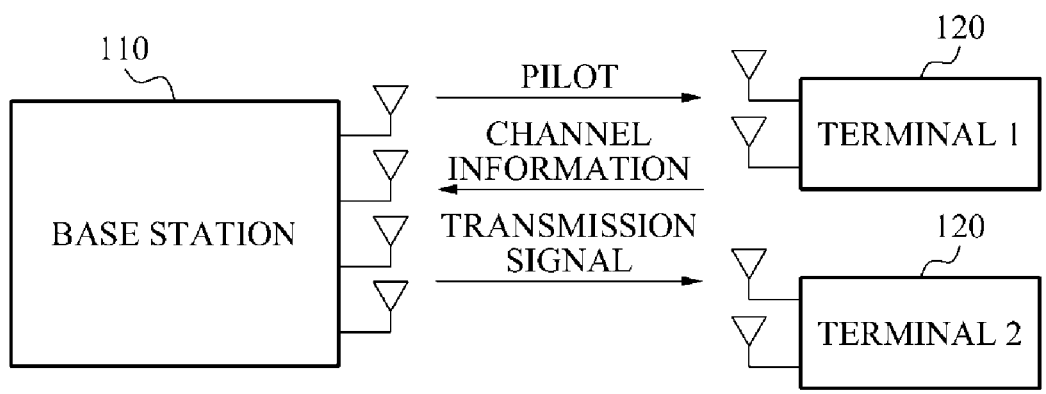
FIG. 1 is a diagram illustrating a communication method of a multiple input multiple output (MIMO) communication system.

Reference will now be made in detail to example embodiments, examples of which are illustrated in the accompanying drawings.

When it is determined that a detailed description is related to a related known function or configuration which may make the purpose of the present disclosure unnecessarily ambiguous in the description, such a detailed description will be omitted. Also, terminologies used herein are defined to appropriately describe the exemplary embodiments and thus may be changed depending on a user, the intent of an operator, or a custom. Accordingly, the terminologies must be defined based on the following overall description of this specification. In the accompanying drawings, like reference numerals refer to the like elements throughout.

FIG. 1 is a diagram illustrating a communication method of a multiple input multiple output (MIMO) communication system.

Referring to FIG. 1, the MIMO communication system may include a base station 110, and a plurality of terminals 120. The base station 110 and the terminals 120 may include a plurality of antennas.

The base station 110 may transmit a pilot to the terminals 120, and each of the terminals 120 may generate channel information by estimating a channel between the base station 110 and the corresponding terminal based on the received pilot. The terminals 120 may feed back the channel information to the base station 110. The base station 110 may schedule the terminals based on the channel information and generate a precoding matrix. The base station 110 may transmit a transmission signal (for example, data) to the terminals 120, using the precoding matrix.

In order for the base station 110 to generate a more proper precoding matrix, the terminals 120 may need to feed back channel information to the base station 110 accurately and frequently.

Figure 2:
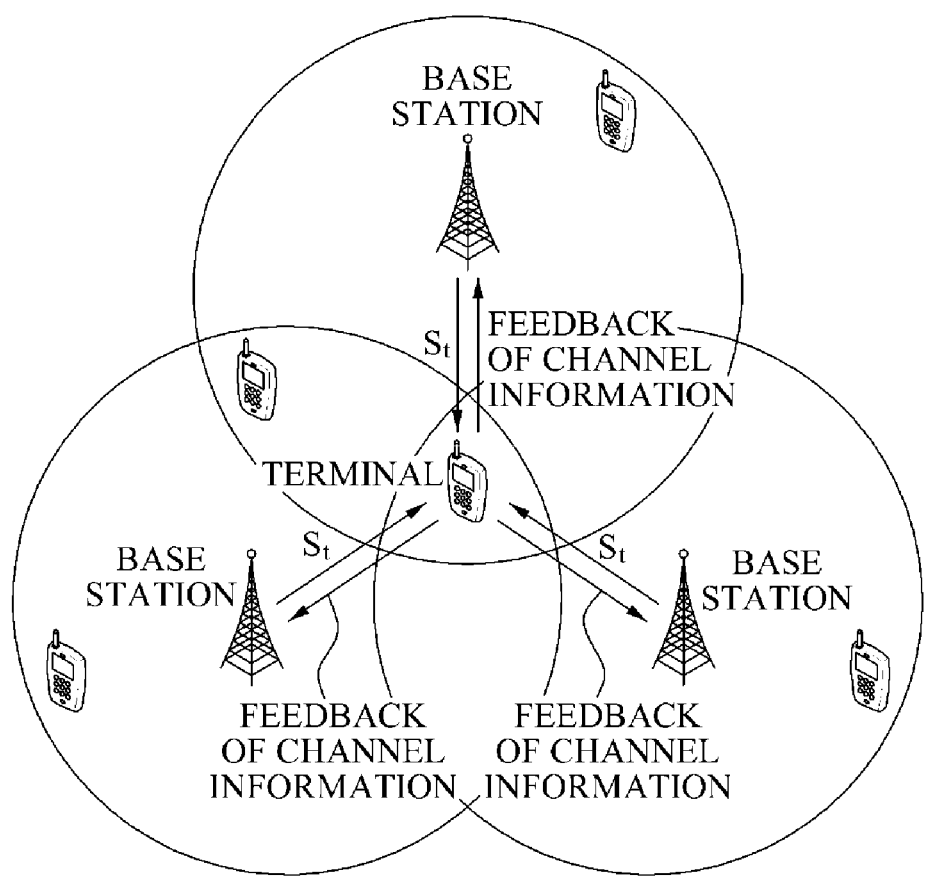
FIG. 2 is a diagram illustrating a multi-cell communication system using a feedback method based on a feedback stop signal according to example embodiments.

FIG. 2 is a diagram illustrating a multi-cell communication system using a feedback method based on a feedback stop signal according to example embodiments.

Referring to FIG. 2, the multi-cell communication system may include a plurality of base stations. The plurality of base stations may cooperate to apply cooperative multipoint transmission/reception. For example, the plurality of base stations may cooperate to transmit signals to a terminal positioned on a cell edge of each of the plurality of base stations, thereby increasing a rate of transmission to the terminal Depending on a case, a terminal may prefer single point transmission/reception to cooperative multipoint transmission/reception. For example, when a channel state of a terminal is changed greatly, a serving base station of the terminal may be changed to another base station through handover, and the terminal and the new serving base station may perform single point transmission/reception, whereby feedback overhead may be reduced and a desired data transmission rate may be achieved.

Here, the cooperative multipoint transmission/reception refers to that a plurality of base stations cooperates to transmit signals to at least one terminal The single point transmission/reception refers to that a single base station transmits signals to at least one terminal, without cooperation with another base station.

At present, third generation partnership project (3GPP) technical specification (TS) 36.213 specifies two types of feedback methods of a terminal. One is a periodic feedback using a physical uplink control channel (PUCCH), and the other is an aperiodic feedback using a physical uplink shared channel (PUSCH).

With respect to the periodic feedback, a terminal may be configured semi-statically by higher layers to perform periodic feedback of channel information using the PUCCH. The channel information may include at least one of a precoding matrix indicator (PMI), channel quality information (CQI), and a rank indicator (RI). When a channel between a base station and a terminal is changed rapidly, a feedback interval of the terminal may be shortened. In addition, in a MIMO communication system or a multipoint cooperative communication system, a number of terminals may increase. In a case in which all terminals feed back channel information at relatively short feedback intervals, feedback overhead may be great. In a single point communication system, a terminal may feedback a single PMI and CQI to a base station. In contrast, in the multipoint cooperative communication system, each terminal may feed back a plurality of PMIs and CQI to a plurality of base stations. Accordingly, a greater increase in feedback overhead may occur.

With respect to the aperiodic feedback, a base station may transmit a feedback request signal to a terminal when extra feedback is needed. The feedback request signal may inform each terminal that feedback is to be performed. Accordingly, when a great number of terminals are provided, signaling overhead may still be extensive. Such a method may be suitable for a case in which a small number of terminals are provided and the terminals do not provide feedback frequently.

In the multipoint cooperative communication system, in view of an increasing number of terminals, increasing feedback information of each terminal, and a channel varying rapidly, revision to a conventional feedback method may be required.

Accordingly, example embodiments provide a feedback method that may reduce feedback overhead and increase a system efficiency.

The feedback method according to example embodiments may correspond to a revised periodic feedback method. The feedback method may reduce overall feedback overhead by reducing a number of feedback terminals. When a terminal receives a feedback stop signal $S_t$ from a base station, the terminal may stop feedback for a number of subframes. When a feedback stop signal is not received, the terminal may perform periodic feedback of channel information.

In particular, the base station may determine a terminal to which a feedback stop signal $S_f$ is to be transmitted, and generate the feedback stop signal $S_f$. The feedback stop signal may include information about a section N for which feedback of channel information is to be stopped. The section N may denote a number of subframes for which the terminal is to stop feedback after the feedback stop signal $S_f$ is received. The section N may be determined by the base station, based on a number of terminals communicating with the base station and transmission ranks of the base station. For example, the section N may be expressed by Equation 1.

$$N=3M/R-1 \quad \text{[Equation 1]}$$

In Equation 1, M denotes a number of terminals communicating a base station, and R denotes a transmission rank of the base station. When the base station transmits a data stream to each terminal, R may denote a number of simultaneously scheduled terminals. The section N may be proportional to the number of the terminals communicating with the base station, and inversely proportional to transmission ranks of the base station.

The base station may transmit a feedback stop signal to at least one terminal for a terminal receiving the feedback stop signal to stop feedback of channel information to the base station over a period indicated by the feedback stop signal. In this example, the base station may transmit the feedback stop signal using a downlink control channel (DCI). For example, the feedback stop signal may be transmitted in a DCI format 0, which is defined in 3GPP TS 36.212.

The terminal may generate channel information including at least one of a PMI, CQI, and an RI. The terminal may estimate a channel matrix H with respect to a channel between the base station and the terminal The terminal may perform singular value decomposition (SVD) with respect to the channel matrix, as given by Equation 2.

$$H=U\Sigma V^H \quad \text{[Equation 2]}$$

In Equation 2, a PMI may be a first right singular vector of V.

CQI may be $\sigma_1$ of the following Equation 3. $\sigma_1$ may be a greatest singular value, among singular values of H.

$$\sum = \begin{bmatrix} \sigma_1 & 0 & 0 & 0 \\ 0 & \sigma_2 & 0 & 0 \end{bmatrix} \quad \text{[Equation 3]}$$

The PMI and the CQI may be determined by other various methods.

The terminal may feed back channel information to the base station. The terminal may perform periodic feedback of the channel information based on a predetermined interval.

When the terminal receives a feedback stop signal from the base station, the terminal may determine a section for which feedback of channel information is to be stopped, based on the feedback stop signal. The terminal may receive the feedback stop signal through the DCI. The terminal may extract, from the feedback stop signal, the section N for which feedback of channel information is to be stopped. The terminal may stop feedback of the channel information for the section. For example, the terminal may stop feedback of the channel information for a section including at least one subframe (for example, N subframes) following a subframe at which the feedback stop signal is received.

The terminal may feed back channel information to the base station at a feedback resume point in time corresponding to the section for which the feedback is to be stopped. In particular, as the terminal performed periodic feedback of the channel information before the feedback stop signal is received, the terminal may perform periodic feedback of the channel information based on a predetermined feedback interval, after the feedback resume point in time elapses.

Figure 3:
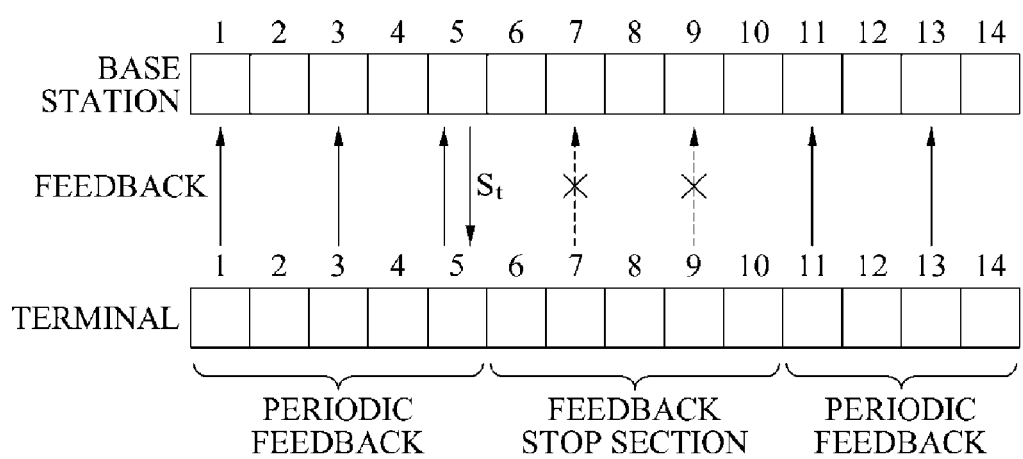
FIG. 3 is a diagram illustrating an example of transmitting/receiving a feedback stop signal and feedback information between a base station and a terminal according to exemplary embodiments.

FIG. 3 is a diagram illustrating an example of transmitting/receiving a feedback stop signal and feedback information between a base station and a terminal according to exemplary embodiments.

A feedback method using a feedback stop signal according to example embodiments may be applicable to a 3GPP system.

Referring to FIG. 3, a base station and subframes of a terminal are illustrated along with indices. The terminal may perform periodic feedback of channel information every other subframe. In particular, the terminal may perform periodic feedback of channel information, at a subframe 1, a subframe 3, and a subframe 5. A feedback interval may be adjustable.

When the base station transmits a feedback stop signal $S_f$ to the terminal, the terminal may stop feedback for predetermined subsequent subframes, in response to reception of the feedback stop signal. In FIG. 3, the base station transmits a feedback stop signal to the terminal at the subframe 5. The feedback stop signal may indicate that a section N for which feedback of channel information is to be stopped corresponds to five subframes (for example, N=5). The terminal may stop feedback for five subframes, from a subframe 6 to a subframe 10. Accordingly, the terminal may not perform feedback at a subframe 7 and a subframe 9, whereby feedback overhead may be reduced. The terminal may resume periodic feedback of channel information starting from a subframe 11.

As described above, the feedback method using a feedback stop signal according to example embodiments may reduce a number of feedback terminals performing unnecessary feedback, thereby reducing feedback overhead and increasing a system efficiency.

The feedback method may be applicable to a cooperative multipoint MIMO communication system. In the cooperative multipoint MIMO communication system, a plurality of base stations may cooperate.

In the cooperative multipoint MIMO communication system, a terminal may receive a feedback stop signal from at least one of the plurality of base stations. The terminal may determine a section N for which feedback of channel information is to be stopped, based on the feedback stop signal. The terminal may feed back channel information to at least one of the plurality of base stations at a feedback resume point in time corresponding to the determined section. The terminal may perform periodic feedback of channel information until another feedback stop signal is received.

In a case of a cooperative multipoint MIMO communication system with high complexity of user scheduling and considerable feedback overhead due to a large number of terminals served by a base station, the feedback method using a feedback stop signal according to example embodiment may be applied more effectively. In particular, the feedback method may remove unnecessary feedback overhead, thereby reducing a complexity of the cooperative multipoint MIMO communication system.

Figure 4:
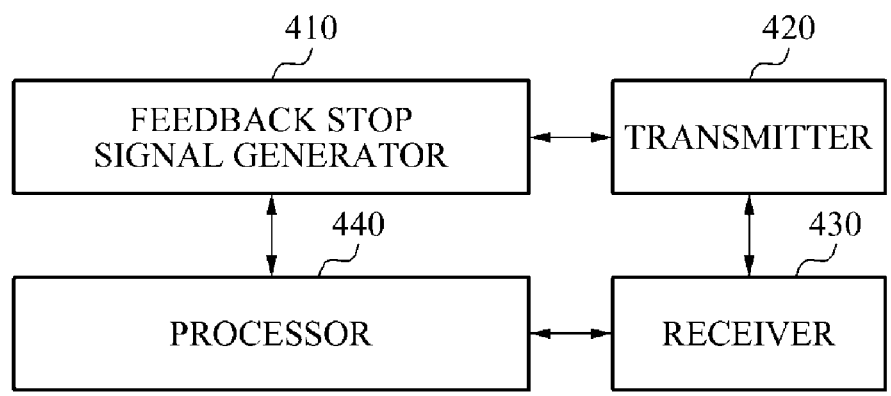
FIG. 4 is a block diagram illustrating a base station that transmits a feedback stop signal to a terminal according to example embodiments.

FIG. 4 is a block diagram illustrating a base station that transmits a feedback stop signal to a terminal according to example embodiments.

Referring to FIG. 4, the base station may include a feedback stop signal generator 410, a transmitter 420, a receiver 430, and a processor 440.

The feedback stop signal generator 410 may generate a feedback stop signal.

The transmitter 420 may transmit the feedback stop signal to at least one terminal for a terminal receiving the feedback stop signal to stop feedback of channel information to the base station over a period indicated by the feedback stop signal. In addition, the transmitter 420 may transmit data to scheduled terminals using a precoding matrix.

The receiver 430 may receive channel information from the terminals. When a feedback stop signal is transmitted, the receiver 430 may receive channel information from at least one terminal receiving the feedback stop signal after a period indicated by the feedback stop signal elapses.

The processor 440 may schedule the terminals based on the channel information received from the terminals, and generate the precoding matrix.

Figure 5:
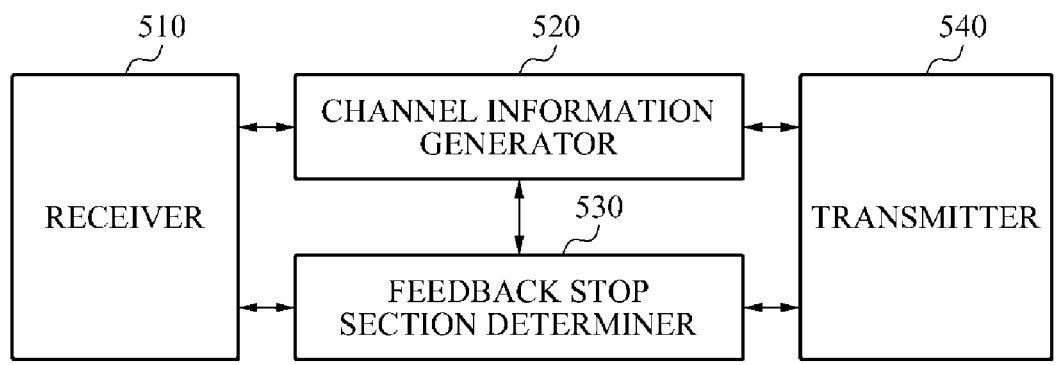
FIG. 5 is a block diagram illustrating a terminal that feeds back channel information based on a feedback stop signal according to exemplary embodiments.

FIG. 5 is a block diagram illustrating a terminal that feeds back channel information based on a feedback stop signal according to exemplary embodiments.

Referring to FIG. 5, the terminal may include a receiver 510, a channel information generator 520, a feedback stop section determiner 530, and a transmitter 540.

The receiver 510 may receive a feedback stop signal from a base station. The receiver 510 may receive data from the base station.

The channel information generator 520 may generate channel information between the base station and the terminal.

The feedback stop section determiner 530 may determine a section for which feedback of channel information is to be stopped, based on the received feedback stop signal.

The transmitter 540 may feed back the channel information to the base station. When the receiver 510 receives a feedback stop signal, the transmitter 540 may feed back the channel information to the base station at a feedback resume point in time corresponding to the section determined by the feedback stop section determiner 530.

A base station and a terminal using a feedback stop signal have been described according to example embodiments. The descriptions provided through various example embodiments with reference to FIGS. 1 through 3 may be applied to the base station and the terminal and thus, a more detailed description will be omitted for conciseness.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, the present disclosure is not limited to the described example embodiments. Instead, it will be apparent to those skilled in the art that various modifications and variation can be made these example embodiments without departing from the spirit or scope of the invention.

Thus, the scope of the present disclosure is not limited to the above-described example embodiments, but should be defined by the claims and their equivalents.

The invention claimed is:

1. A method of feeding back channel information by a terminal in a Multiple Input Multiple Output (MIMO) communication system comprising a base station and a plurality of terminals, the method comprising:
receiving a feedback stop signal from the base station;
discontinuing transmission of feedback associated with channel information for a time period indicated by information comprised in the feedback stop signal, the time period being determined by the base station based on a number of terminals communicating with the base station and a transmission rank of the base station; and
transmitting the feedback associated with the channel information to the base station after the time period elapses,
wherein a length of the time period is inversely proportional to the transmission rank of the base station, and
wherein the transmission rank denotes a number of simultaneously-scheduled terminals of the plurality of terminals.

2. The method of claim 1,
wherein the feedback stop signal comprises information associated with the time period in subframes, and
wherein a number of subframes included in the time period is based on the number of terminals communicating with the base station and on a number of transmission ranks of the terminals communicating with the base station.

3. The method of claim 2, wherein the number of subframes is proportional to the number of the terminals communicating with the base station and inversely proportional to the number of the transmission ranks of the terminals communication with the base station.

4. The method of claim 1, wherein the transmitting of the feedback comprises performing periodic feedback of channel information based on a predetermined feedback interval after the time period elapses.

5. The method of claim 1, wherein the feedback stop signal is received on a Downlink Control Channel (DCI).

6. The method of claim 1, further comprising:
discontinuing transmission of the feedback of the channel information during the time period.

7. The method of claim 1, wherein the time period comprises at least one subframe following a subframe in which the feedback stop signal is received.

8. The method of claim 1, wherein the channel information comprises at least one of a Precoding Matrix Indicator (PMI), Channel Quality Information (CQI), and a Rank Indicator (RI).

9. A communication method of a base station in a Multiple Input Multiple Output (MIMO) communication system comprising the base station and a plurality of terminals, the method comprising:
generating a feedback stop signal, the feedback stop signal being based on a number of terminals communicating with the base station;
transmitting the feedback stop signal to at least one terminal wherein the at least one terminal discontinues transmission of feedback associated with channel information for a time period indicated by information comprised in the feedback stop signal; and receiving the feedback associated with the channel information from the at least one terminal after the time period elapses, wherein the time period being determined by the base station based on the number of terminals communicating with the base station and a transmission rank of the base station, wherein a length of the time period is inversely proportional to the transmission rank of the base station, and wherein the transmission rank denotes a number of simultaneously-scheduled terminals of the plurality of terminals.

10. The method of claim 9, wherein the generating of the feedback stop signal comprises:

determining a number of subframes in which to discontinue transmission of the feedback of the channel information based on the number of terminals communicating with the base station and on a number of transmission ranks of the terminals communicating with the base station; and generating the feedback stop signal comprising information about the determined number of subframes.

11. The method of claim 10, wherein the determining of the number of subframes comprises:

determining the number of subframes to be proportional to the number of the terminals communicating with the base station, and determining the number of subframes to be inversely proportional to the number of the transmission ranks of the terminals communicating with the base station.

12. The method of claim 9, wherein the feedback stop signal is transmitted over a Downlink Control Channel (DCI).

13. A method of feeding back channel information by a terminal in a multipoint Multiple Input Multiple Output (MIMO) communication system comprising the terminal and a plurality of base stations cooperating with each other, the method comprising:

receiving a feedback stop signal from at least one of the plurality of base stations;

discontinuing transmission of feedback associated with channel information for a time period indicated by information comprised in the feedback stop signal, the time period being determined by the base station based on a number of terminals communicating with the at least one of the plurality of base station and a transmission rank of the base stations; and transmitting the feedback associated with the channel information to the at least one of the plurality of base stations after the time period elapses, wherein a length of the time period is inversely proportional to the transmission rank of the base station, and wherein the transmission rank denotes a number of simultaneously-scheduled terminals of the plurality of terminals.

14. The method of claim 13, wherein the feedback stop signal comprises information associated with the time period in subframes, and wherein a number of subframes included in the time period is determined based on number of terminals communicating with the at least one of the plurality of base stations and on a number of transmission ranks of the terminals communicating with the at least one of the plurality of base stations.

15. The method of claim 13, wherein the transmitting of the feedback comprises performing periodic feedback of channel information based on a predetermined feedback interval after the time period elapses.

16. A terminal for transmitting feedback information associated with channel information in a Multiple Input Multiple Output (MIMO) communication system comprising a base station and a plurality of terminals, the terminal comprising:

a receiver configured to receive a feedback stop signal from the base station, the feedback stop signal being based on a number of terminals communicating with the base station; and a transmitter configured to transmit the feedback associated with the channel information to the base station after a time period elapses, wherein the terminal discontinues transmission of feedback associated with channel information based on information comprised in the feedback stop signal from the base station, wherein the time period is determined by the base station based on the number of terminals communicating with the base station and a transmission rank of the base station, wherein a length of the time period is inversely proportional to the transmission rank of the base station, and wherein the transmission rank denotes a number of simultaneously-scheduled terminals of the plurality of terminals.

17. The terminal of claim 16, wherein the transmitter is further configured to transmit periodic feedback associated with the channel information based on a predetermined feedback interval after the time period elapses.

* * * * *